Oct. 30, 1951   J. M. HALL ET AL   2,572,857
METHOD AND APPARATUS FOR SPRAY DRYING
Filed Aug. 4, 1948
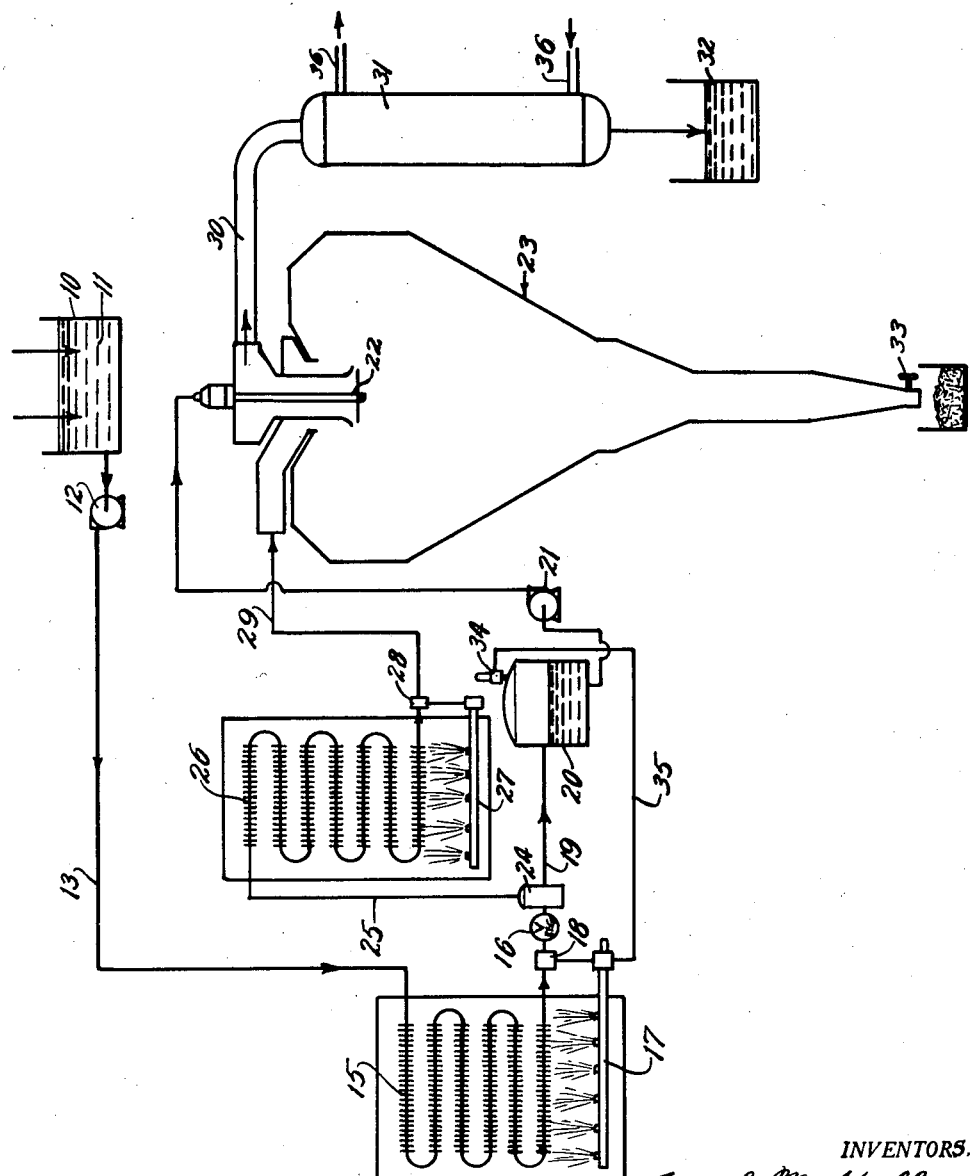
INVENTORS.
Joseph M. Hall &
Herbert E. Tucker.
By:- Mann and Brown
Attys.

Patented Oct. 30, 1951

2,572,857

UNITED STATES PATENT OFFICE 2,572,857

METHOD AND APPARATUS FOR SPRAY DRYING

Joseph M. Hall and Herbert E. Tucker, Chicago, Ill., assignors to Drying & Concentrating Company, a corporation of Delaware Application August 4, 1948, Serial No. 42,504

5 Claims. (Cl. 159—48)

This invention relates to a process and apparatus for recovering solids from a liquid and is particularly useful when the liquid being processed is of high viscosity or tacky, or when the drying must be done in a pre-selected atmosphere to prevent undesirable chemical reactions from taking place during the concentrating and drying operation.

Although the invention has wide application in the concentrating and drying field, and is suitable for concentrating and drying such things as milk, eggs, fluid juices, etc., it will serve the purpose of this disclosure to describe the system and the apparatus employed therewith in its application to the process of producing furfural.

In addition to the above objects of the invention, it is also an objective to provide a system that is economical to operate, that effects full recovery of the solids in the liquid, as well as the liquid itself, and that is made up of relatively inexpensive apparatus components.

Further and other objects and advantages will become apparent as the disclosure proceeds and the description is read in conjunction with the accompanying drawing, which shows in schematic form a preferred embodiment of the invention.

It should be understood in describing the apparatus shown, there is no intention to impose limitations on the scope of the appended claims, except as may be required by the prior art.

Referring now to the drawing, the reference character 10 designates a tank or reservoir containing a liquid 11 which is to be concentrated and dried. In the process of making furfural from wood pulp, the latent liquor recovered from washing lignin fibers with water contains a substantial quantity of soluble materials which are appropriate for use in making furfural. This latent liquor may be concentrated in any well-known manner, and, for the purpose of this disclosure but purely as an illustration, it will be assumed that the liquid 11 is the product of a concentration process which results in the liquid 11 containing a desired percentage of solubles or solids, possibly on the order of fifty per cent. Also, it will be assumed, for the purpose of illustration, that the necessary acids, catalysts, and other chemicals have been added to make the liquid 11 ready for further concentration and drying to powder form.

When concentrated to the extent of having the desired percentage of solid material in the liquid 11, the liquid is of high viscosity and tacky, and great difficulty has been experienced in ordinary processes of concentrating and drying because of the tendency of the tacky liquid to adhere to the walls of the concentrating and drying apparatus, with the result that the apparatus must be frequently shut down for cleaning.

In the present invention, this is avoided by the use of apparatus and process steps which cause the liquid to pass through the apparatus at relatively high velocity, so that the material itself tends to scour out the apparatus and keep the walls clean. It has been determined empirically that if the velocity is too high, there is a tendency for abrasive action to take place, thereby damaging the apparatus, and the values of temperature and pressures will be determined in each instance by the character of the material being handled by the apparatus.

The liquid 11 is forced by a positive displacement pump 12 into a line 13 and thence through a heating coil 15, the latter having a pressure control or reducing valve 16 on its outlet side which maintains the pressure within the line 13 at a relatively high pressure, say on the order of five hundred pounds per square inch. A gas burner 17 controlled in part by a heat regulator 18 in the line 13 brings the temperature of the liquid in the line 13 up to say 450° F., which temperature is maintained by the regulator 18, except as its action is modified by other control equipment, as hereinafter explained.

As soon as the liquid in the line 13 exceeds the pressure at which the valve 16 is set, it will release the liquid into a line 19 with an immediate flashing into vapor of a substantial part of the liquid in the concentrate that is passed through the valve 16, the amount of course depending upon the pressure and temperature maintained in the line 13. The highly concentrated residue flows into a tank 20 from which it is fed by a pump 21 into the spray head 22 of a drier, generally designated 23, which preferably is of the form disclosed in Hall patent, No. 2,217,547, issued October 8, 1940.

The vapor flashed in the line 19, due to the reduction in pressure of the concentrate from five hundred pounds to near atmospheric pressure, is separated from the concentrate by a separator 24 and fed through a line 25 to a heating coil 26 subjected to heat from a gas burner 27 controlled in its operation by the thermostatic heating regulator 28. The vapor is superheated in this coil at a temperature of say 500° F., and is then fed through a line 29 to the drier 23, where it serves as the drying medium for the highly concentrated material being sprayed into the drier through the head 22. The superheated vapor enters the drier in such manner that it partakes of a rapid circulatory movement, as disclosed in said Hall patent, No. 2,217,547, with the result that it commingles with the liquid concentrate being delivered to the spray head 22 in finely divided or atomized form, and the superheat evaporates the last traces of water or other liquid from the liquid concentrate. The steam or vapor with its superheat removed by the drying action is then conducted through a passage 30 to a conventional condenser 31, and here it is condensed, with the condensate being passed into a reservoir 32. Water inlet and outlet passages for the condenser are indicated at 36.

Preferably, the pump 21 is of the controllable, variable delivery type, so that the rate at which the liquid concentrate is delivered to the spray head 22 may be controlled in accordance with the capacity of the superheated steam entering the drier through the line 29 to completely dry the liquid concentrate. The powdered residue is collected at the bottom of the drier 23 and removed through a gate 33, as desired.

In order to effect full automatic control of the process, and to maintain the apparatus as a closed system, the tank 20 is preferably closed but is equipped with a pressure regulator and relief valve 34 which is connected through a pressure tube 35 to modify the thermostatic control of the burner 17. In other words, as the pressure in the tank 20 rises, the pressure regulator 34 serves to reduce the volume of gas flowing to the burner 17, even though the thermostatic control 18 calls for full heat, thus slowing down the first stage of the process until the drying stage catches up to it. The relief valve associated with the regulator 34 is for obvious safety control.

It will be seen from the above description of a preferred form of the invention, and its illustrative application to the concentrating and drying of furfural, that the system has many inherent advantages that make it suitable, not only for this purpose, but for other uses as well. The maintaining of the liquid in the line 13 at a relatively high temperature makes it more fluid and capable of flow without adhering to the pipes, and the velocity with which the liquid concentrate moves through the system after it passes the valve 16 is sufficiently high to sweep the line 19 clear, up to the tank 20. The pump 21, in addition to being of the controllable, variable speed type, is also of the positive displacement type, so that there is no problem of the liquid being forced through the spray head 22.

Another advantage of the system that has been disclosed is the fact that the drying step is done in an atmosphere composed solely of vapors of the liquid which had acted as a solvent, or carrier, for the solid material. Hence, to the extent that it is important to keep the material being dried from contact with an oxidizing atmosphere, or an atmosphere containing substances which might react unfavorably with the material being dried, this is readily accomplished.

Although the illustrative use of the apparatus has involved the use of an aqueous solution, it is obviously suitable for use with non-aqueous solutions, with the pressures and temperatures being suitably chosen, in the light of the disclosure herein made.

It should be noted that the process and apparatus is particularly advantageous when a vaporizable catalyst is used. Such a catalyst may be added to the material to be concentrated while it is in the tank 10 or before, and when it flashes into vapor after passing the valve 16, and is then superheated with other vapors to serve as the drying medium in the drier 23, it is fully recoverable in the condenser 31.

We claim:

1. The process of concentrating and drying liquids which consists in subjecting the liquid to heat and pressure, reducing the pressure of the liquid to a point sufficient to cause some of the liquid to vaporize, superheating the vapor thus formed, and then subject the remaining liquid concentrate to intimate contact with said superheated vapor by spraying said concentrate into an atmosphere of such vapor.

2. The process of concentrating and drying liquids which consists in subjecting the liquid to heat and pressure, reducing the pressure of the liquid to a point sufficient to cause some of the liquid to vaporize, superheating the vapor thus formed, and then forcing the liquid concentrate in atomized form into intimate physical contact with a whirling mass of said superheated vapor.

3. The process of concentrating and drying liquids which consists in subjecting the liquid to heat and pressure, reducing the pressure of the liquid to a point sufficient to cause some of the liquid to vaporize, superheating the vapor thus formed, subjecting the remaining liquid concentrate to intimate contact with said superheated vapor by spraying said concentrate into an atmosphere of such vapor, and finally removing the vapor and condensing it.

4. Apparatus for concentrating and drying liquid concentrates comprising means for heating the liquid under pressure to a relatively high temperature, a drier including a spray head and inlet and outlet passages for a drying medium, a pump for delivering the material to be dried to the spray head, a conduit for delivering liquid concentrate from said first-named means to the pump, a pressure reducing valve interposed in said conduit, means for superheating vapor flashed from the concentrate after it passes the pressure reducing valve, and means for delivering the superheated vapor to the inlet passage of the drier.

5. Apparatus for concentrating and drying liquid concentrates comprising means for heating the liquid under pressure to a relatively high temperature, a drier including a spray head and inlet and outlet passages for a drying medium, a pump for delivering the material to be dried to the spray head, a conduit for delivering liquid concentrate from said first-named means to the pump, a pressure reducing valve interposed in said conduit, means for superheating vapor flashed from the concentrate after it passes the pressure reducing valve, means for delivering the superheated vapor to the inlet passage of the drier, and means for condensing said vapor after it leaves the drier.

JOSEPH M. HALL.
HERBERT E. TUCKER.

REFERENCES CITED

The following references are of record in the file of this patent:

UNITED STATES PATENTS

| Number | Name | Date |
|---|---|---|
| 1,273,208 | Weil | July 23, 1918 |
| 1,482,143 | Peebles | Jan. 29, 1924 |
| 1,799,478 | Peebles | Apr. 7, 1931 |
| 2,142,984 | Thurman | Jan. 3, 1939 |
| 2,170,351 | Junkins | Aug. 22, 1939 |
| 2,182,428 | Fladmark | Dec. 5, 1939 |
| 2,217,547 | Hall | Oct. 8, 1940 |
| 2,289,191 | Hall | July 7, 1942 |
| 2,434,672 | Pattee | Jan. 20, 1948 |

FOREIGN PATENTS

| Number | Country | Date |
|---|---|---|
| 124,732 | Great Britain | Aug. 28, 1919 |